(12) United States Patent
Merl et al.

(10) Patent No.: US 10,180,935 B2
(45) Date of Patent: Jan. 15, 2019

(54) IDENTIFYING MULTIPLE LANGUAGES IN A CONTENT ITEM

(71) Applicant: Facebook, Inc., Menlo Park, CA (US)

(72) Inventors: Daniel Matthew Merl, Livermore, CA (US); Aditya Pal, San Jose, CA (US); Stanislav Funiak, Menlo Park, CA (US); Seyoung Park, Menlo Park, CA (US); Fei Huang, Menlo Park, CA (US); Amac Herdagdelen, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/422,463

(22) Filed: Feb. 2, 2017

(65) Prior Publication Data
US 2018/0189259 A1 Jul. 5, 2018

Related U.S. Application Data

(60) Provisional application No. 62/440,983, filed on Dec. 30, 2016.

(51) Int. Cl.
*G06F 17/27* (2006.01)
*G06F 17/22* (2006.01)

(52) U.S. Cl.
CPC ........ *G06F 17/275* (2013.01); *G06F 17/2775* (2013.01); *G06F 17/2294* (2013.01)

(58) Field of Classification Search
CPC .................................................. G06F 17/275
USPC ................................................ 704/1, 2, 8, 9
See application file for complete search history.

(56) References Cited

U.S. PATENT DOCUMENTS

| | | | |
|---|---|---|---|
| 5,293,581 A | 3/1994 | DiMarco et al. | |
| 5,477,451 A | 12/1995 | Brown et al. | |
| 5,510,981 A | 4/1996 | Berger et al. | |
| 5,991,710 A | 11/1999 | Papineni et al. | |
| 6,002,998 A | 12/1999 | Martino et al. | |
| 6,125,362 A * | 9/2000 | Elworthy | G06F 17/275 |

(Continued)

OTHER PUBLICATIONS

Final Office Action dated Sep. 8, 2017 for U.S. Appl. No. 15/445,978 of Herdagdelen, A. filed Feb. 28, 2017.

(Continued)

*Primary Examiner* — Shaun Roberts

(57) ABSTRACT

A system for identifying language(s) for content items is disclosed. The system can identify different languages for content item words segments by identifying segment languages that maximize a probability across the segments. The probability can be a combination of: an author's likelihood for the language identified for the first word; a combination of transition frequencies for selected languages identified for words, the transition frequencies indicating likelihoods that a transition occurred to the selected language from the previous word's language; and a combination of observation probabilities indicating, for a given word in the content item, a likelihood the given word is in the identified language. For an in-vocabulary word, the observation probabilities can be based on learned probability for that word. For an out-of-vocabulary word, the probability can be computed by breaking the word into overlapping n-grams and computing combined learned probabilities that each n-gram is in the given language.

19 Claims, 7 Drawing Sheets

(56) References Cited

U.S. PATENT DOCUMENTS

| | | | |
|---|---|---|---|
| 6,157,905 A | 12/2000 | Powell | |
| 6,223,150 B1 | 4/2001 | Duan et al. | |
| 6,266,642 B1 | 7/2001 | Franz et al. | |
| 6,304,841 B1 | 10/2001 | Berger et al. | |
| 6,393,389 B1 | 5/2002 | Chanod et al. | |
| 7,289,911 B1* | 10/2007 | Rigney | G06F 19/28 702/19 |
| 7,437,284 B1* | 10/2008 | Margulies | G06F 17/275 704/227 |
| 7,827,026 B2 | 11/2010 | Brun et al. | |
| 8,145,484 B2 | 3/2012 | Zweig et al. | |
| 8,306,808 B2* | 11/2012 | Elbaz | G06F 17/273 704/8 |
| 8,468,011 B1* | 6/2013 | Sites | G06F 17/275 704/2 |
| 8,756,050 B1 | 6/2014 | Curtis et al. | |
| 8,838,434 B1 | 9/2014 | Liu | |
| 8,935,150 B2 | 1/2015 | Christ | |
| 8,942,973 B2 | 1/2015 | Viswanathan | |
| 9,104,661 B1 | 8/2015 | Evans | |
| 9,734,142 B2 | 8/2017 | Huang et al. | |
| 9,740,687 B2 | 8/2017 | Herdagdelen et al. | |
| 2002/0087301 A1 | 7/2002 | Jones et al. | |
| 2002/0169592 A1 | 11/2002 | Aityan | |
| 2003/0040900 A1 | 2/2003 | D'Agostini et al. | |
| 2003/0130846 A1* | 7/2003 | King | G10L 15/144 704/255 |
| 2004/0002848 A1 | 1/2004 | Zhou et al. | |
| 2004/0098247 A1 | 5/2004 | Moore | |
| 2004/0122656 A1 | 6/2004 | Abir | |
| 2004/0243392 A1 | 12/2004 | Chino et al. | |
| 2005/0055630 A1 | 3/2005 | Scanlan et al. | |
| 2005/0228640 A1 | 10/2005 | Aue et al. | |
| 2006/0111891 A1 | 5/2006 | Menezes et al. | |
| 2006/0206798 A1 | 9/2006 | Kohlmeier et al. | |
| 2006/0271352 A1 | 11/2006 | Nikitin et al. | |
| 2007/0130563 A1 | 6/2007 | Elgazzar et al. | |
| 2008/0077384 A1 | 3/2008 | Agapi et al. | |
| 2008/0281578 A1 | 11/2008 | Kumaran et al. | |
| 2009/0083023 A1 | 3/2009 | Foster et al. | |
| 2009/0132233 A1 | 5/2009 | Etzioni et al. | |
| 2009/0198487 A1 | 8/2009 | Wong et al. | |
| 2009/0210214 A1 | 8/2009 | Qian et al. | |
| 2009/0276206 A1 | 11/2009 | Fitzpatrick et al. | |
| 2009/0281789 A1 | 11/2009 | Waibel et al. | |
| 2009/0326912 A1 | 12/2009 | Ueffing et al. | |
| 2010/0121639 A1 | 5/2010 | Zweig et al. | |
| 2010/0125447 A1* | 5/2010 | Goswami | G06F 17/275 704/8 |
| 2010/0223048 A1 | 9/2010 | Lauder et al. | |
| 2010/0312769 A1* | 12/2010 | Bailey | G06F 17/30705 707/740 |
| 2011/0099000 A1 | 4/2011 | Rai et al. | |
| 2011/0137636 A1 | 6/2011 | Srihari et al. | |
| 2012/0029910 A1 | 2/2012 | Medlock et al. | |
| 2012/0047172 A1 | 2/2012 | Ponte et al. | |
| 2012/0123765 A1 | 5/2012 | Estelle et al. | |
| 2012/0158621 A1 | 6/2012 | Bennett et al. | |
| 2012/0173224 A1 | 7/2012 | Anisimovich et al. | |
| 2012/0209588 A1 | 8/2012 | Wu et al. | |
| 2012/0253785 A1 | 10/2012 | Hamid et al. | |
| 2012/0330643 A1 | 12/2012 | Frei et al. | |
| 2013/0018650 A1 | 1/2013 | Moore et al. | |
| 2013/0084976 A1 | 4/2013 | Kumaran et al. | |
| 2013/0103384 A1 | 4/2013 | Hunter et al. | |
| 2013/0173247 A1 | 7/2013 | Hodson et al. | |
| 2014/0006929 A1 | 1/2014 | Swartz et al. | |
| 2014/0040371 A1* | 2/2014 | Gurevich | H04L 61/609 709/204 |
| 2014/0081619 A1 | 3/2014 | Solntseva et al. | |
| 2014/0172413 A1 | 6/2014 | Cvijetic et al. | |
| 2014/0195884 A1 | 7/2014 | Castelli et al. | |
| 2014/0207439 A1 | 7/2014 | Venkatapathy et al. | |
| 2014/0280592 A1 | 9/2014 | Zafarani et al. | |
| 2014/0288917 A1 | 9/2014 | Orsini et al. | |
| 2014/0288918 A1 | 9/2014 | Orsini et al. | |
| 2014/0335483 A1 | 11/2014 | Buryak et al. | |
| 2014/0337989 A1 | 11/2014 | Bojja Nikhil et al. | |
| 2014/0350916 A1 | 11/2014 | Jagpal et al. | |
| 2014/0358519 A1 | 12/2014 | Dymetman et al. | |
| 2014/0365200 A1 | 12/2014 | Sagie | |
| 2015/0006148 A1* | 1/2015 | Goldszmit | G06F 17/275 704/8 |
| 2015/0033116 A1 | 1/2015 | Severdia et al. | |
| 2015/0134322 A1 | 5/2015 | Cuthbert et al. | |
| 2015/0142420 A1 | 5/2015 | Sarikaya et al. | |
| 2015/0161104 A1 | 6/2015 | Buryak et al. | |
| 2015/0161114 A1 | 6/2015 | Buryak et al. | |
| 2015/0161115 A1 | 6/2015 | Denero et al. | |
| 2015/0161227 A1 | 6/2015 | Buryak et al. | |
| 2015/0363388 A1 | 12/2015 | Green et al. | |
| 2016/0048505 A1 | 2/2016 | Tian et al. | |
| 2016/0117628 A1 | 4/2016 | Brophy et al. | |
| 2016/0162473 A1 | 6/2016 | Hedley et al. | |
| 2016/0177628 A1 | 6/2016 | Juvani | |
| 2016/0357519 A1 | 12/2016 | Vargas et al. | |
| 2017/0083504 A1 | 3/2017 | Huang | |
| 2017/0270102 A1 | 9/2017 | Herdagdelen et al. | |
| 2017/0315988 A1 | 11/2017 | Herdagdelen et al. | |

OTHER PUBLICATIONS

Notice of Allowance dated Oct. 23, 2017 for U.S. Appl. No. 15/445,978 of Herdagdelen, A. filed Feb. 28, 2017.

Non-Final Office Action dated Aug. 25, 2017 for U.S. Appl. No. 15/652,175 by Herdagdelen, A., filed Jul. 17, 2017.

U.S. Appl. No. 15/672,690 of Huang, F., filed Aug. 9, 2017.

Zamora, J.D., et al., "Tweets language identification using feature weightings," Proceedings of the Twitter language identification workshop, Sep. 16, 2014, 5 pages.

Extended European Search Report for European Application No. 16161095.1, dated Feb. 16, 2017, 4 pages.

U.S. Appl. No. 15/644,690 of Huang, F. et al., filed Jul. 7, 2017.

Koehn, P. et al., "Statistical Phrase-Based Translation," Proceedings of the 2003 Conference of the North American Chaper of the Association for Computational Linguistics on Human Language Technology—vol. 1, Assoc, for Computational Linguistics, 2003, pp. 48-54.

Sutskever, I., et al., "Sequence to sequence learning with neural networks," Advances in Neural Information Processing Systems, pp. 3104-3112, 2014.

Vogel, S. et al., "HMM-Based Word Alignment in Statistical Translation." In Proceedings of the 16th Conference on Computational Linguistics—vol. 2, Association for Computational Linguistics, 1996, pp. 836-841.

International Search Report and Written Opinion for International Application No. PCT/US2015/051737, dated Jul. 28, 2016, 22 pages.

U.S. Appl. No. 14/302,032 of Herdagdelen, A. et al., filed Jun. 11, 2014.

U.S. Appl. No. 15/445,978 by Herdagdelen, A., et al., filed Feb. 28, 2017.

U.S. Appl. No. 14/861,747 by Huang, F., filed Sep. 22, 2015.

Final Office Action dated Jul. 1, 2016, for U.S. Appl. No. 14/302,032 of Herdagdelen, A., filed Jun. 11, 2014.

Non-Final Office Action dated Dec. 17, 2015, for U.S. Appl. No. 14/302,032 of Saint Cyr, L., filed Jun. 11, 2014.

Non-Final Office Action dated Jul. 28, 2016, for U.S. Appl. No. 14/861,747 of Huang, F., filed Sep. 22, 2015.

Notice of Allowance dated Nov. 30, 2016, for U.S. Appl. No. 14/302,032 of Herdagdelen, A., filed Jun. 11, 2014.

Notice of Allowance dated Apr. 7, 2017 for U.S. Appl. No. 14/861,747 by Huang, F., et al., filed Sep. 22, 2015.

Notice of Allowance dated Apr. 20, 2017 for U.S. Appl. No. 14/302,032 by Herdagdelen, A., et al., filed Jun. 11, 2014.

Non-Final Office Action dated Jun. 26, 2017 for U.S. Appl. No. 15/445,978 of Herdagdelen, A., filed Feb. 28, 2017.

(56) References Cited

OTHER PUBLICATIONS

Notice of Allowance dated Dec. 8, 2017 for U.S. Appl. No. 15/652,175 by Herdagdelen, A., filed Jul. 17, 2017.

* cited by examiner

IDENTIFYING MULTIPLE LANGUAGES IN A CONTENT ITEM

CROSS-REFERENCE TO RELATED APPLICATION

This application claims the benefit of U.S. Provisional Patent Application No. 62/440,983, entitled "INFERRING LANGUAGES", which was filed on Dec. 30, 2016, which is incorporated by reference herein in its entirety.

BACKGROUND

The Internet has made it possible for people to connect and share information globally in ways previously undreamt of. Social media platforms, for example, enable people on opposite sides of the world to collaborate and share ideas in content items. A "content item," as used herein, refers to a digital visual or audio data that includes a representation of one or more words or groups of characters from a natural language. In some implementations, content items can be obtained from social network items, such as posts, news items, events, shares, comments, etc. "Words," as used herein, can be traditional words, i.e. characters separated by whitespace or punctuation, or can be other character groupings, such as a specified number of characters. Content items generated by Internet users that at least partially contain natural language are often quite short and frequently contain portions in different languages. These and other factors can make it difficult to identify in which languages various parts of these content items were created.

One way digital content providers attempt to address this is by utilizing machine learning engines. A "machine learning engine," or "model" as used herein, refers to a construct that is trained to make predictions for new data items, whether or not the new data items were included in the training data. For example, training data can include items with various parameters and an assigned classification. A machine learning engine trained using this training data can generate a value corresponding to a classification, e.g. a probability, for new data items. The internal state of some models can represent a distribution. Examples of machine learning engines include: neural networks, support vector machines, decision trees, probability distributions, Parzen windows, Bayes, clustering, reinforcement learning, and others. Machine learning engines can be configured for various situations, data types, sources, and output formats and machine learning engines that predict various outcomes can be combined in various ways. These factors provide a nearly infinite variety of configurations for machine learning engines.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
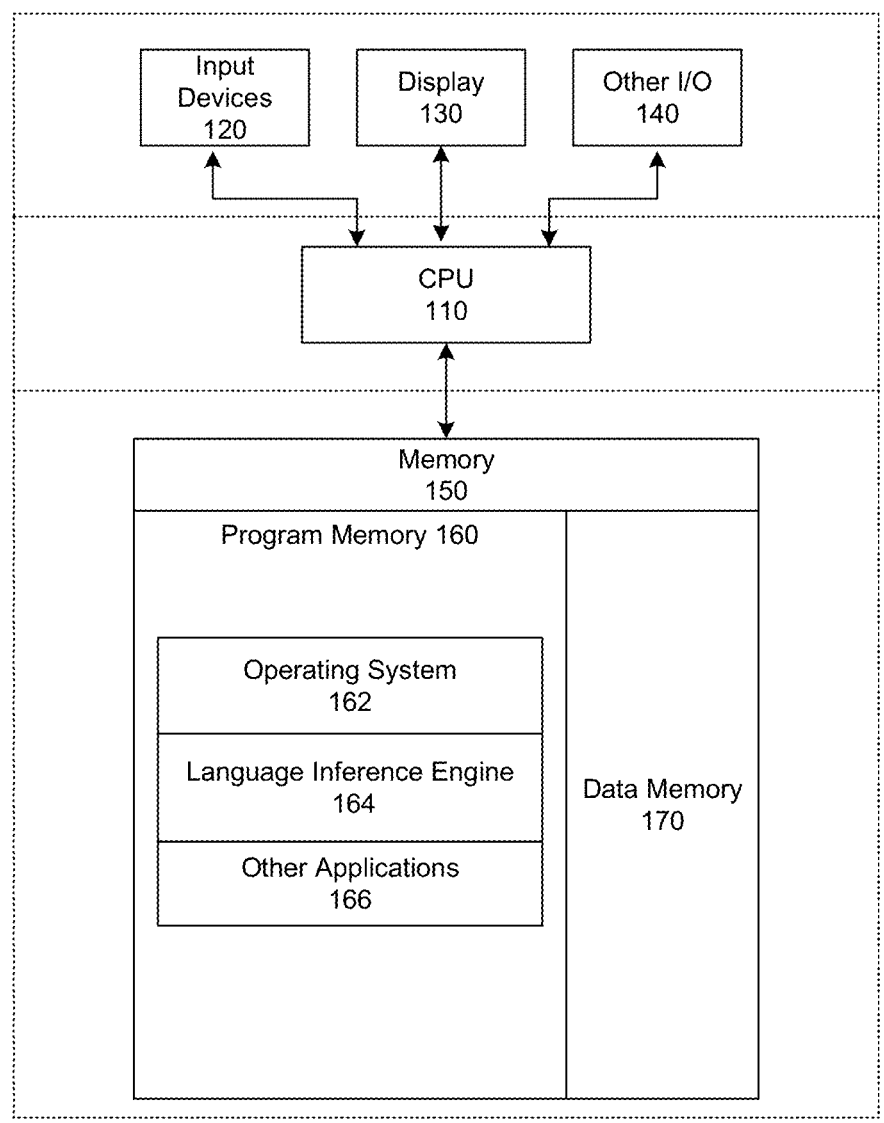
FIG. 1 is a block diagram illustrating an overview of devices on which some implementations can operate.

Language identification can be a prerequisite for many text processing and information retrieval applications. For example, natural language processing tasks such as machine translation, part-of-speech tagging, topic labeling, and spell checking depend on accurate language identification, especially while processing multilingual contents. In addition, information retrieval applications such as search engines also rely heavily on language identification of web pages as well as input search queries for retrieving relevant documents.

Social media platforms (e.g., social media websites) present challenges for language identification of contents on social media platforms. These challenges primarily arise due to the following aspects of social media posts: (1) presence of out-of-vocabulary words such as emoticons, slang, typos, inflected words, and non-traditional punctuations, (2) ambiguous text due to short content, and (3) multilingual content containing sentences or phrases written in different languages. These aspects make it challenging to build a reliable language model that can efficiently handle the volume of social media posts for language identification in a real time.

A language inferring system (also referred to as language identification system or language inference system) is described herein that can identify one or more languages used in a content item and how the words in the content item are segmented according to those language. Content items, such as from social media sources, frequently include only short snippets of language or portions that is are written in different languages. This can make processing such content items difficult, such as when performing a translation, spelling or grammar correction, responding to a question, etc. The language inferring system can perform machine identification of languages in a content item by tokenizing the content item (e.g. into word tokens) and identify highest likelihood language segments based on a combination of output from one or more of: author language model(s), language transition frequency model(s), n-gram observation model(s), or dictionary observation model(s).

An author language model (also referred to as user language model) can provide predictions about what languages a user is facile with. In some implementations, an author language model can include a probability distribution for a user that provides, for a given language, a likelihood that the user writes in the given language. In some implementations, an author language model can be created for a user based on factors such as a historical usage of language by the user, what content items the user has accessed, what languages identified friends of the user are known to use, etc. A language transition frequency model can provide predictions about when content items are likely to transition between languages. In some implementations, an author language model can include a probability distribution indicating when a language is likely to transition from a first given language to a second given language. These probabilities can be determined based on historical observations of language transitions in content items.

An n-gram observation models and dictionary observation models can provide a prediction for a given token in a content item for whether the token is in a particular language. In various implementations, an observation model can include a probability distribution that provides, for a given input token, a likelihood that the input token is in a given language. In some implementations, an n-gram observation model can take a token from a content time, e.g. an unrecognized word, and provide a probability that the n-gram is in a given language. In some implementations, the n-gram observation model can take multiple n-grams from a token as input, which can be overlapping n-grams. The n-gram observation model can produce the probability output based on a learned distribution mapping n-grams to languages. For example, this distribution can be a trained neural network that has been trained by taking n-grams in a known language and modifying the neural network to produce output more closely matching an indication of the known language. In some implementations, a dictionary observation model can take a token from a content, e.g. a recognized word, and provide a probability that the token is in a given language. The dictionary observation model can provide these probabilities based on how often the token has been observed appearing in content items in known languages.

The output from two or more of these models can be combined using various algorithms to assign a language identification for each token. In some implementations, the combination algorithm can include computing the maximum (e.g., Viterbi Max) of a product of: (1) the author language model's prediction of the user's ability to write in a language for the first token, (2) output from language transition frequency models corresponding to each token for a language of the token given the language of the previous token, and (3) output for each token form one of the observation models indicating that the token is in a given language, where which observation model is chosen to compute the output for each token is based on whether the token is a known word. Based on the assigned language identifications, the language inferring system can determine segments of the content item that share a common language.

Environment and Architecture of Language Inferring System

Performing machine language processing to identify language segments in content items can include sophisticated technical algorithms such as tokenizing a content item, determining aspects of the tokens, assigning probabilities to those aspects, combining those probabilities to select language identifiers for the tokens, and groupings tokens into language segments. Many different machine learning models can be created to determine the probabilities and the output from these models can be combined in many different ways. The disclosed language inferring system can improve machine language identifications by computing a combined probability that accounts for expectations in one or more of: the author's historical use of language, an observed frequency of language switching for various languages, and an analysis of word usage dependent upon (A) observed frequencies of known word usage in one or more languages or (B) observed frequencies of n-gram usage in one or more languages for unknown words.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can infer one or more languages used in a content item and which segments of the content item use which language. Device 100 can include one or more input devices 120 that provide input to the CPU (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, language inference engine 164, and other application programs 166. Memory 150 can also include data memory 170 that can include parameters of machine learning models, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
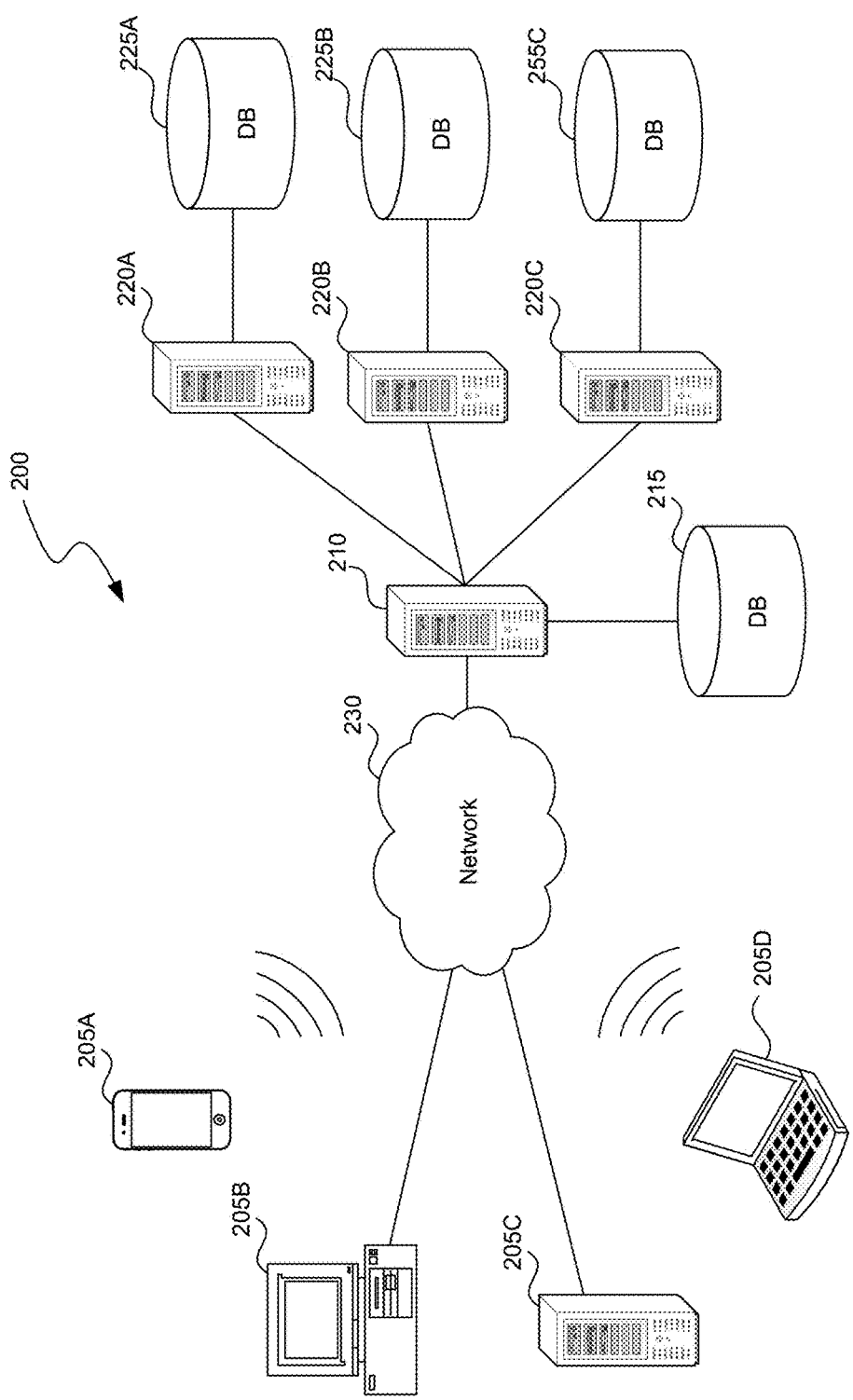
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as model parameters of various machine learning models and training datasets. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3A:
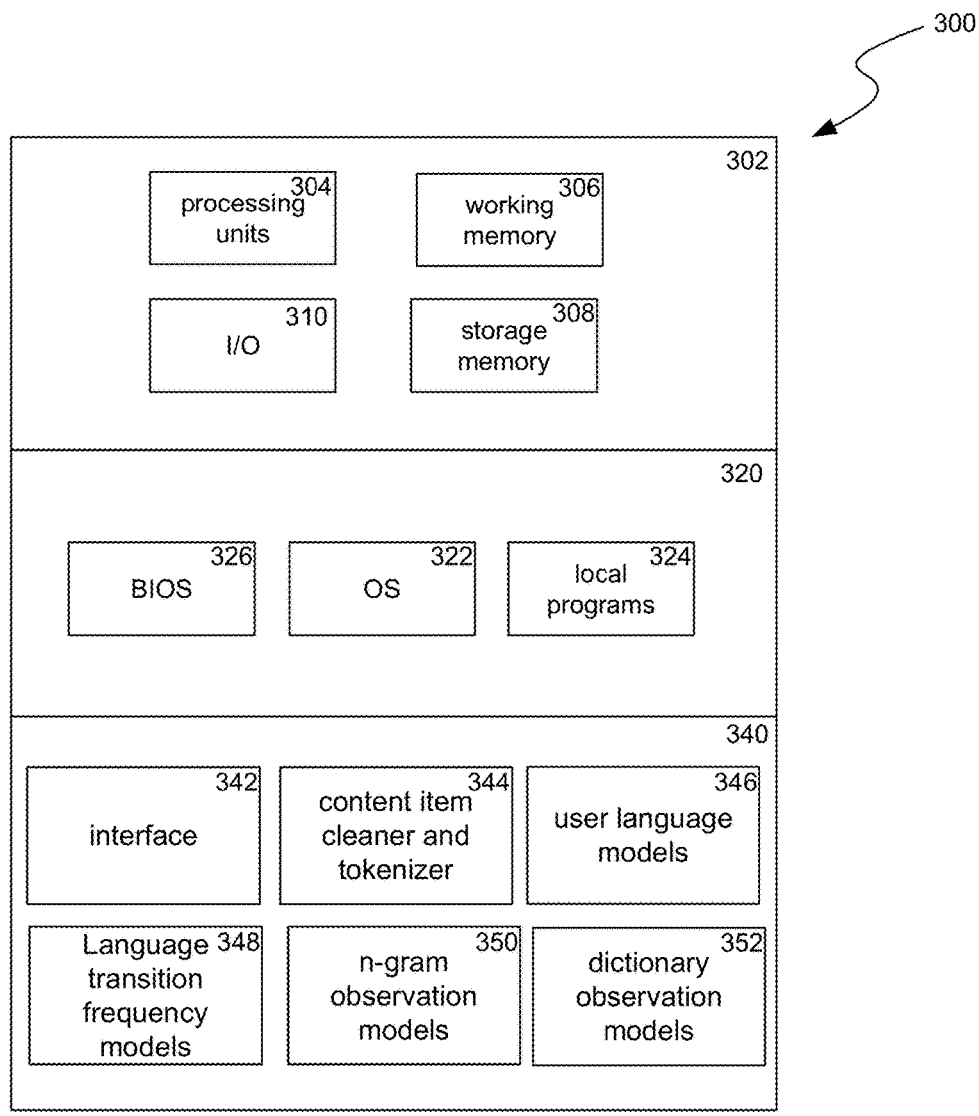
FIG. 3A is a block diagram illustrating a language inferring system which, in some implementations, can be used as a system employing the disclosed technology.

FIG. 3A is a block diagram illustrating a language inferring system 300 which, in some implementations, can be used as a system employing the disclosed technology. The language inferring system 300 (also referred to as simply "system") can include hardware 302, general software 320, and specialized components 340. As discussed above, a system implementing the disclosed technology can use various hardware including processing units 304 (e.g. CPUs, GPUs, APUs, etc.), working memory 306, storage memory 308, and input and output devices 310. The system 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include content item cleaner and tokenizer 344, user language models 346, language transition frequency models 348, n-gram observation models 350, dictionary observation models 352, and components which can be used for transferring data and controlling the specialized components, such as interface 342. In some implementations, the system 300 can be a computing system that is distributed across multiple computing devices or can be an interface to a server-based application executing one or more of specialized components 340.

A "model," as used herein, refers to a component that is trained using training data to make predictions or provide probabilities for new data items, whether or not the new data items were included in the training data. For example, training data can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, and others. Models can be configured for various situations, data types, sources, and output formats.

In some implementations, an n-gram observation model can be a neural network with multiple input nodes that receive representations of n-grams. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used as a probability that the input n-gram is in a specified language.

Goals and Challenges of Language Inferring System

Given an input text (e.g., a social media post), the goal of the language inferring system can be to infer one or more languages of the input text (or at least the top language candidates), along with their associated confidence levels. The confidence levels can allow the downstream applications to filter out uncertain predictions that may degrade results of the downstream applications. The language inferring system can address two types of language identification problems: monolingual identification and multilingual identification.

In monolingual identification, the input text can be assumed to be in a single language. Even for monolingual identification, the language inferring system can overcome the challenge of inferring languages of texts posted by social media users. Those texts on social media platforms can commonly include out-of-vocabulary, inflected words, slang, and misspellings. In some cases, the spelling mistakes can be intentional (e.g., "mah lyf mah rulez"). In some other cases, languages such as Russian can inflect the words, changing their prefix or suffix based on case, plurality, or tense. Those inflected or misspelled words may not be included in dictionary. The language inferring system can include a mechanism to handle the out-of-vocabulary words, which may generalize across languages.

Social media users also widely use emoticons and non-words to express themselves. For example, social media users commonly use "XOXOXO" as love, ":P" as teasing, "O.o" as confusion, etc. The tokenizer module of the language inferring system can properly tokenize the combinations of letters and punctuations in those emoticons and non-words. Furthermore, contents on social media tend to be short. In some embodiments, more than 50% of posts on a social media platform can have fewer than 5 words. The language inferring system can infer one or more languages for those short posts.

In multilingual identification, the input text can contain phrases or sentences in multiple languages. Multilanguage identification can happen in various scenarios. For example, multilingual (e.g., bilingual) users may wish to communicate to multilingual audience and write content in multiple languages. The contents written by the multilingual o-users can interleave different languages at the paragraph or sentence level. Alternatively, an otherwise monolingual content can include a foreign word of expression, and therefore can interleave different languages at phrase level.

The language inferring system can handle transitions among languages at any granularity, by properly detecting the transition points. For example, language inferring system can identify sentence or paragraph boundaries if the multilingual content transitions at sentence or paragraph boundaries, despite of usage of punctuations for emoticons (e.g., ";-)"). The language inferring system can properly handle both multilingual and monolingual contents, without knowing a priori whether an input text is multilingual or monolingual.

Machine Learning Model of Language Inferring System

An input text of a machine learning model of the language inferring system can be represented by w. The machine model can tokenize the input text w into a set of tokenized input text $\{w_1, \ldots, w_T\}$, where T denotes the number of tokens (e.g., words) in the input text. Thus, the input text can be represented by $w_{1:T}$. For $1 \leq t < T$, the token $w_{t+1}$ appears after token $w_t$ in the input text. There a number L of supported languages. Variable Y can denote a language among the number L of supported languages. Variable y denotes an instance of a specific language.

For a monolingual input text, the goal of the machine learning model can be to identify the language y associated with the input text $w_{1:T}$. In some embodiments, the machine learning model can be, e.g., a Bayesian model (also referred to as Bayes classifier) that treats all tokens independently given the language of the input text. A joint distribution over the language and the input text can be:

$$p(y, w_{1:T} \mid \theta) = p(y \mid \mu) \times \prod_{t=1}^{T} p(w_t \mid y, \lambda), \quad \text{(Model 1)}$$

where $\theta = (\mu, \lambda)$ are the model parameters, $p(y|\mu)$ is the prior that specifies an initial guess of the language before any tokens are observed, and $p(w_t|y, \lambda)$ is the observation model that assigns the probability to token $w_t$ under each possible language y.

For a multilingual input text, the goal of the machine learning model can be to identify a language sequence $y_{1:T}$ associated with the input tokens $\{w_1, \ldots, w_T\}$. In some embodiments, the machine learning model can be, e.g., a Hidden Markov Model ("HMM") that treats the language of each token as independent of the language identified before that token, given the language for the previous token. A joint distribution over the language sequence and the input text can be:

$$p(y_{1:T}, w_{1:T}|\theta) = p(y_1|\mu) \times \prod_{t=2}^{T} p(y_t|y_{t-1},\mu) \times \prod_{t=1}^{T} p(w_t|y_t, \lambda), \quad \text{(Model 2)}$$

where $p(y_1|\mu)$ is the initial distribution over the language of the first token, $p(y_t|y_{t-1}, \mu)$ is the transition probability of switching from one language to another language, and $p(w_t|y_t, \lambda)$ is the observation model that assigns the probability to token $w_t$ under each possible language $y_t$. Such a machine learning model (e.g., a HMM) can capture the a priori assumptions about the frequency of transitions among the languages, and also can allow for a proper and efficient inference and training.

Given known model parameters $\theta = (\mu, \lambda)$ (e.g., through training), the output inference of the machine learning model (e.g., model 1 or model 2) can be the language identification. For example, the model can infer the single most likely language given the observed token sequence $w_{1:T}$, by solving an optimization of $\max_y p(y|w_{1:T}, \theta)$. The optimization can be solved by, e.g., computing a dense representation of the posterior $p(y|w_{1:T}, \theta)$. Similarly, the model can infer the most likely language sequence of an observed token sequence $w_{1:T}$, by solving an optimization of $\max_{y_{1:T}} p(y_{1:T}|w_{1:T}, \theta)$ The optimization can be solved by, e.g., using a Viterbi algorithm that leverages the structure of the joint distribution Model 2 to efficiently compute the maximum.

Training of Machine Learning Model

The machine learning model can use a training process to generate the model parameters $\theta = (\mu, \lambda)$. In some embodiments, the machine learning model can be trained either in a supervised way or an unsupervised way. In the supervised way, the languages y are already identified in the training data set. In the unsupervised way, the languages y may not be identified in the training data set. Alternatively, the machine learning model can be trained in a semi-supervised way, where the languages y are only identified in a subset of the training examples of the training data set.

In some embodiments, for a supervised training process, the input of the training process can be a collection of training examples $\{w^{(i)}\}$, where each $w^{(i)}$ represents one example text as a sequence of tokens, along with an identified language $\{y^{(i)}\}$ (also referred to as label). The supervised training process can be, e.g., a maximization of a complete log-likelihood:

$$\max_{\theta} \sum_i \log p(y^{(i)}, w^{(i)}_{1:T_i} \mid \theta). \quad \text{(Objective 1)}$$

Because the range of supported languages L is finite, the prior distribution $p(y|\mu)$ in a Bayesian model (e.g., model 1) can be, e.g., represented as a dense vector with L entries, $p(y|\mu) = \mu_y$. For a HMM (e.g., model 2), the initial distribution can also be a dense vector, and the transition distribution can be a dense matrix in $\mathbb{R}_+^{L \times L}$. In some embodiments, the observation model can represent the probabilities for each token w explicitly via a sparse matrix $\mathbb{R}_+^{L \times N}$, where N is the number of unique tokens in the corpus (e.g., a dictionary of words or phrases). Such a model is referred to as dictionary observation model $p_d(w|y)$, which can be akin to a physical dictionary listing words. The components of this model can be computed via simple counts, e.g., by setting $\mu_y \propto |\{i : y^{(i)} = y'\}|$.

In some other embodiments, for an unsupervised training process, the process can be a maximization of a marginal log-likelihood:

$$\max_\theta \sum_i \log p(w_{1:T_i}^{(i)} \mid \theta) = \max_\theta \sum_i \log \sum_y p(y, w_{1:T_i}^{(i)} \mid \theta). \quad \text{(Objective 2)}$$

In some embodiments, a computation-efficient approximation of this optimization problem can be a maximization of a lower-bound through Expectation Maximization (EM), which interleaves expectation (e.g., inference) and maximization (e.g., counting). In some embodiments, a semi-supervised training process can involve a maximization of a weighted sum of the objective 1 and objective 2.

Obtaining Training Data for Machine Learning Model

In some embodiments, the machine learning model can use public sources with known languages as training data. For example, the labeled training data (e.g., with identified languages) can be retrieved from online encyclopedia, such as Wikipedia. However, in some embodiments, the language used in social media can differ substantially from the languages used in sources like the encyclopedia. To obtain a training set that better represents the textual contents of the social media, actual social media content (also referred to as organic content) can be used for training. For example, in some embodiments, the observation model can be trained in a semi-supervised process. In other words, the observation model can be seeded with public, labeled data (e.g., online encyclopedia content) and then can be trained with unlabeled organic data (unlabeled means that the language of data has not been identified yet).

In some alternative embodiments, the language inferring system can use heuristics to obtain a set of labeled organic training data. The language inferring system can identify social media posts or comments where a user producing the content and another user receiving it share the same preferred language setting. In that case, the language inferring system can reliably identify that the posts or comments are in a language that is common between the two users. In other words, the heuristic is that if user A made a direct post P for user B and that a language of A matches a language of B, then label post P with that language.

The language inferring system can further filter out posts or comments where the heuristically determined language does not match the language that is predicted by a previous version of the machine leaning model (e.g., a version of the model that has not been trained by the current set of training data that the system is filtering). The filtering process can increase the labeling precision. Because the model can use the dataset to learn a conditional distribution p(w|y) for each language y, the labeled dataset does not need to be balanced across languages in at least some embodiments.

Incorporating Out-of-Vocabulary Tokens

Since the languages used in social media can involve inflected words, typos, and slangs, it is possible that the training data does not include all words that appear in social media. Such missing words outside of the training data are referred to as out-of-vocabulary (OOV) tokens. The OOV tokens usually follow recognizable patterns and not just strings of random characters. Thus, the language inferring system can decompose each OOV token into an overlapping sequence of character n-grams, which are used as features in a classifier. The language inferring system can use the n-grams as a fallback model that is combined with the dictionary model in a principled manner.

Let $g_n(w)$ denote a sparse vector extracted from a token w, where each position i in the vector corresponds to a unique character n-gram, and the value $g_n(w)_i$ is the number of times that the n-gram i occurred in the token. For instance, with n=5, the token "annual" can include four n-grams (annu, annua, nnual, nual), each with weight 1. language inferring system can use a discriminative model that takes on the form of a multinomial logistic regression:

$$p_n(y \mid g_n(w); \lambda) = \frac{\exp\{\tau_y^\top g_n(w)\}}{\sum_{y'} \exp\{\tau_{y'}^\top g_n(w)\}}.$$

Thus, the model can be specified by L parameter vectors $\lambda_y : y \in \{1, \ldots, L\}$. To compute the probability of language y, the language inferring system can take the inner product of the weights $\lambda_y$ and the n-grams $g_n(w)$.

The discriminative model can be leaned by maximizing the complete data log-likelihood:

$$\max_\lambda \sum_y \sum_{w \in D_y} \frac{c_{yw}}{\sum_{w' \in D_y} c_{yw'}} \log p_n(y \mid g_n(w); \lambda).$$

The summation can be over all languages y and all words w in the corpus for language y. In some embodiments, the language inferring system can take any corpus for the language. In some other embodiments, the system can use a smoother version of a dictionary. In the dictionary $D_y$ for language y, each weight $c_{yw}$ can be the frequency of word w in the dictionary for language y. The weights can be normalized, such that the fallback observation model is not biased towards any language. To maximize the complete data log-likelihood, the system can run, e.g., batch conjugate gradient descent initialized via stochastic gradient descent with $L_2$ regularization. The system can further project the parameters to the non-negative orthant $\mathbb{R}_+^{L \times M}$ at each iteration of the conjugate gradient descent.

Combination of Observation Models

The system can combine the two observation models, a dictionary model $p_d(w|y)$ and the n-gram model $p_n(w|y)$, into a single, consistent observation model p(w|y). An auxiliary random variable $V \in \{0,1\}$ can be introduced to represent whether the token W is in-vocabulary (1) or out-of-vocabulary (0). The system can define a joint distribution over W and V given the language Y:

$$p(w,v|y) = p(v|y) \times p(w|v,y),$$

where p(v=1|y) is the probability that the token w is in-vocabulary, henceforth denoted as $\gamma_y$. The conditional distribution p(w|v, y) can select either the dictionary $p_d(w|y)$ or the fallback n-gram model $p_n(w|y)$, depending on whether the word is in-vocabulary or out-of-vocabulary for language y. The latent variable V can predict the in-vocabulary/out-of-vocabulary status of the word:

$$p(w \mid v, y) = \begin{cases} p_d(w \mid y) & \text{if } w \in D_y \wedge v = 1, \\ p_n(w \mid y) & \text{if } w \notin D_y \wedge v = 0, \\ 0 & \text{otherwise} \end{cases}$$

The final observation model p(w|y) can be obtained by marginalizing out V from p(w, v|y):

$$p(w \mid y) = \begin{cases} \gamma_y p_d(w \mid y) & \text{if } w \in D_y, \\ (1-\gamma_y) p_n(y \mid g_n(w)) \sum_{y'} p_d(w \mid y') & \text{if } w \notin D_y. \end{cases}$$

The final observation model can match the intuition that the OOV likelihood is on the same scale as the in-vocabulary likelihood. In some embodiments, the system can fix the in-vocabulary rate $\gamma_y = 0.9$ for all languages with n=5.

User Language Model Based on User-Specific Priors

In some embodiments, if the observation models do not provide enough information to distinguish the language, a user's language priors can be helpful in language identification. To preserve a user's priors, the system can maintain a histogram of previous language predictions by the system over public posts of the user. The system can apply an exponential decay to the histogram counts, so that the system prefers the languages used in the present over the languages used in the past. The system can further apply a smoothing function (e.g., Laplacian smoothing) to the priors. For monolingual prediction, the system can use the user language model in place of the generic prior (e.g., population-wide prior) $p(y|\mu)$ in the Bayesian classifier model 1.

For multilingual identification, in the case of HMM, the system can bias the estimates by replacing the initial distribution of the HMM with the user language model. This work particularly well if the initial words in the user's post are among the top languages in the user language model of that particular user. In some alternative embodiments, the system can adapt the user language model at prediction time, such that the stationary distribution of the HMM matches the user language model.

Transitions at any Granularity for Multilingual Identification

The language inferring system can be flexible to detect transition points at both token-level and sentence-level. In other words, the system can be flexible for transition granularity. The system can classify the language of each token or sentence or paragraph independently.

In some embodiments, the system can assume that the transitions follow the Markov property, meaning that a token label (e.g., language identification for a token) is independent of all other token labels, given the two adjacent tokens. The Markov property can enforce a smoothness constraint in the transitions, while still allows the transitions to happen at any point. The degree of smoothness can be determined by the data. In some embodiments, to recover the segments for each language, the system can compute the Viterbi decoding or the marginal using Forward-Backward algorithm.

Flowchart for Processing a Language Identification Request

Figure 3B:
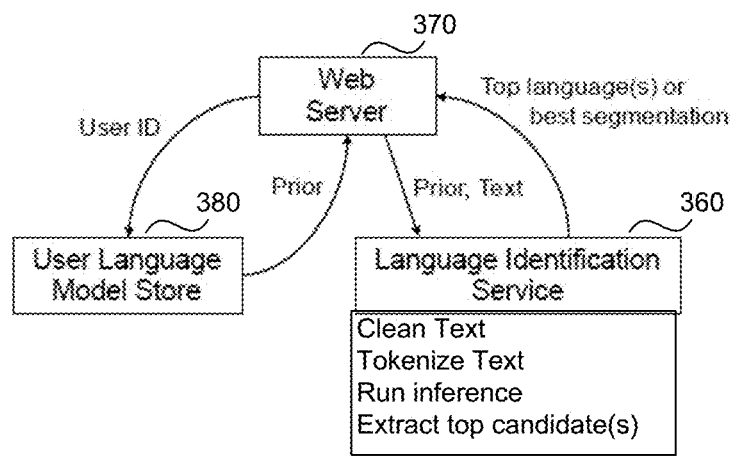
FIG. 3B is a flow diagram illustrating a process used in some implementations for handling a language identification request.

FIG. 3B is a flow diagram illustrating a process used in some implementations for handling a language identification request. As illustrated in FIG. 3B, in some embodiments, the language inferring system can run as a Language Identification Service 360, which is independent of and separate from the Web Server 370 (e.g., a web server for social media). The separation between the Language Identification Service 360 and the Web Server 370 can allow deploying the machine learning model independently from the changes made to the Web Server 370.

Similarly, the User Language Model Store 380 can run as a service that is independent of and separate from the Web Server 370. The architecture illustrated in FIG. 3B can allow updating the user language model at a regular interval, which keeping the Language Identification Service 360 stateless.

Upon the Language Identification Service 360 receives a request to identify an input text, the Service 360 can clean the input text. Considering a sample input text including a URL such as http://music.on.us, a tokenization process without cleaning would result in four tokens that bias the language detection towards English. To address the bias issue, the cleaning process can eliminate special strings such as dates, times, email addresses, URLs, hashtags, emoji and emoticons, mentions, symbols, and common non-words (e.g., "xoxoxo"). The cleaning process can replace the special strings with equivalent amount of whitespace, which preserves the text boundaries for the input text. In some embodiments, the text cleaning process can be before the tokenization, since the special strings can include punctuation symbols that would be broken if the input text is tokenized without cleaning.

Then the Service 360 can tokenize the cleaned input text. In some embodiments, the tokenization process can first use whitespaces as boundaries to split the text into tokens. The tokenization based on whitespaces works well for languages such as English and Russian but does not work for languages such as Chinese and Japanese. So the tokenization process can run each token through a computer character library (e.g., International Components for Unicode (ICU) library), which can use a dictionary based splitting method for locales that are not whitespace delimited. The tokenization process can further split the tokens based on special characters that are missed by the computer character library. The tokenization process can further normalize the token by converting them to lower-case, removing stand-alone numeric values, and removing character repetitions in excess of certain count.

The tokens can be sent to the inference engine that computes the posterior distribution $p(y|w_{1:T})$ or $p(y_{1:T}|w_{1:T})$, depending whether the identification is monolingual or multilingual. The Service 360 can extract top k languages (candidates) along with the associated confidence levels (for monolingual identification) or the most likely segmentation (for multilingual identification).

Flow Charts

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
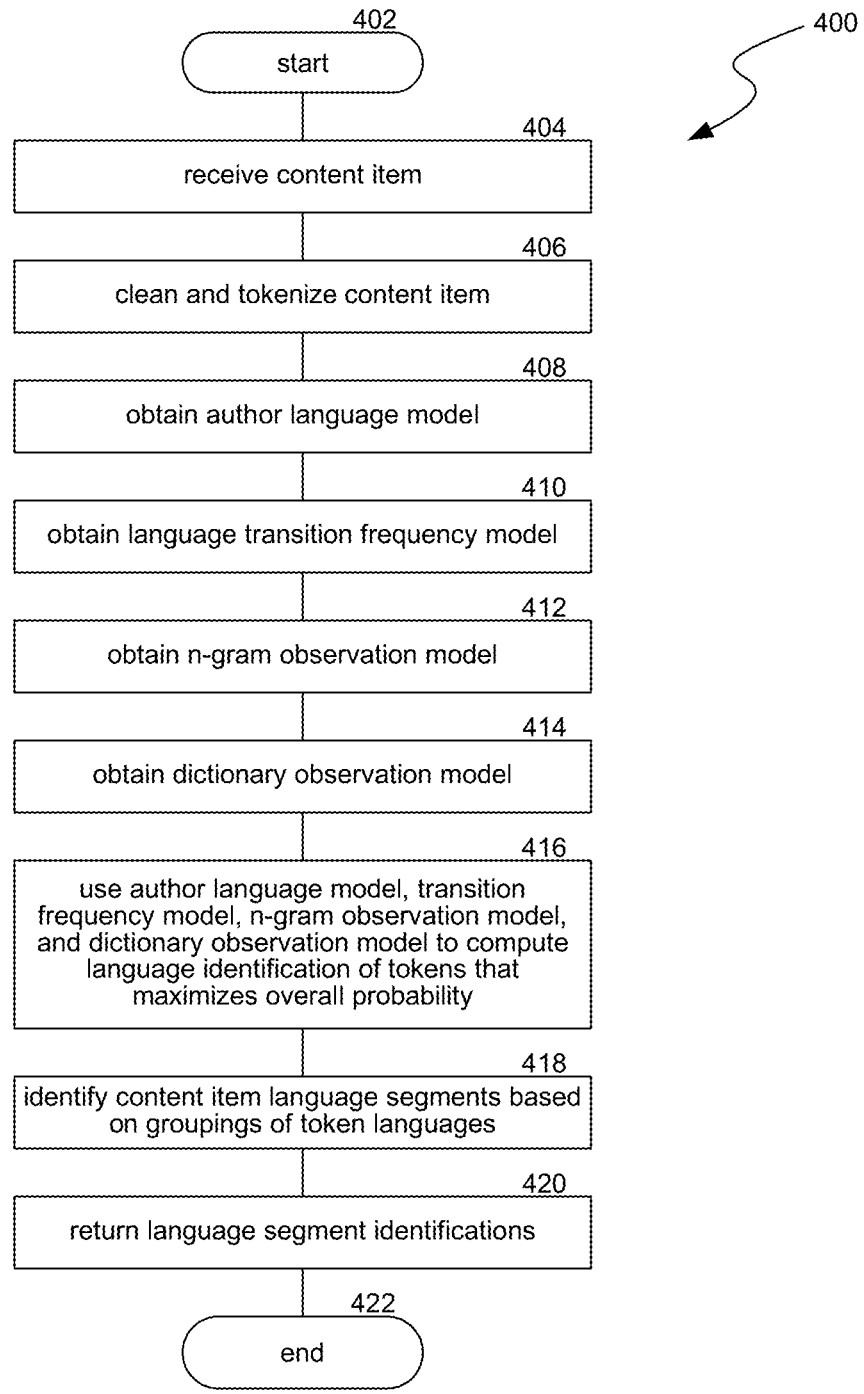
FIG. 4 is a flow diagram illustrating a process used in some implementations for determining language segments of a content item.

FIG. 4 is a flow diagram illustrating a process 400 used in some implementations for determining language segments of a content item. Process 400 begins at block 402 and continues to block 404. At block 404, the language inferring system (also referred to as simply "system") receives a content item. At block 406, the system cleans and tokenizes the content item.

At block 408, the system obtains an author language model. At block 410, the system obtains a language transition frequency model. At block 412, the system obtains an n-gram observation model. At block 414, the system obtains a dictionary observation model. At block 416, the system uses the author language model, the language transition frequency model, the n-gram observation model, and the dictionary observation model to compute the language identification of the tokens that maximizes the overall probability.

At block 418, the system identifies the content item language segments based on groupings of the identified token languages. At block 420, the system returns the language segment identifications. The process 400 ends at block 422.

Figure 5:
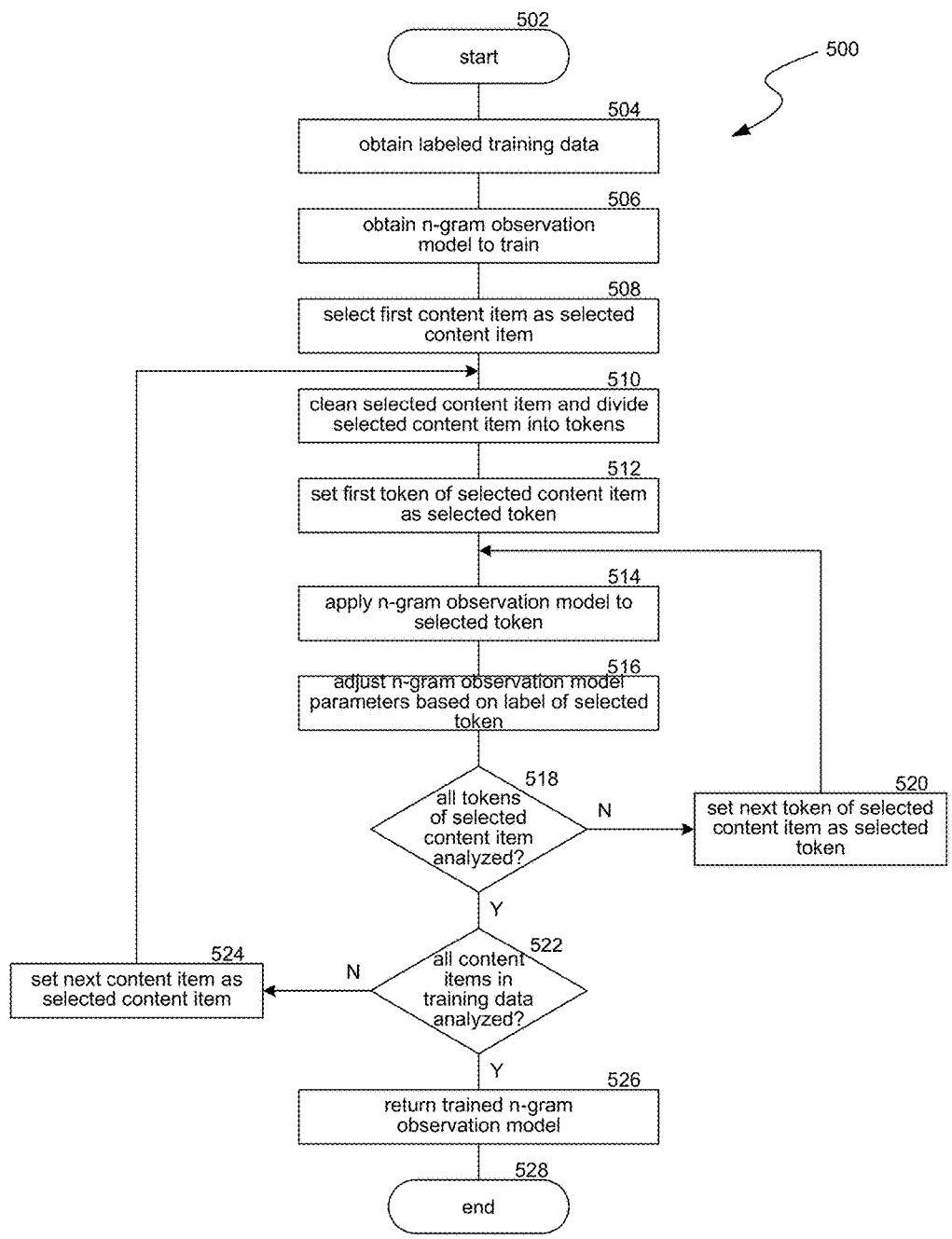
FIG. 5 is a flow diagram illustrating a process used in some implementations for training an n-gram observation model.

FIG. 5 is a flow diagram illustrating a process 500 used in some implementations for training an n-gram observation model. Process 500 begins at block 502 and continues to block 504. At block 504, the language inferring system obtains labeled training data. At block 506, the system further obtains an n-gram observation model to train.

At block 508, the system selects a first content item as the selected content item. At block 510, the system cleans the selected content item and divides the selected content item into tokens. At block 512, the system sets the first token of the selected content item as the selected token. At block 514, the system applies the n-gram observation model to the selected token. At block 516, the system further adjusts the n-gram observation model parameters based on the label (e.g., known language) of the selected token.

At decision block 518, the system determines whether all tokens of the selected content item have been analyzed. If not, the process 500 proceeds to the block 520, wherein the system sets a next token of the selected content item as the selected token. Then the process 500 proceeds back to the block 514 to apply the n-gram observation model again.

If all tokens of the selected content item have been analyzed, the process 500 proceeds to the decision block 522. At decision block 522, the system determines whether all content items in the training data have been analyzed. If not, the process 500 proceeds to the block 524, wherein the system sets the next content item as the selected content item. Then the process 500 proceeds back to the block 510 to clean and divide the selected content item.

If all content items in the training data have been analyzed, the process 500 proceeds to block 526, where the system returns the trained n-gram observation model. The process 500 ends at block 528.

Figure 6:
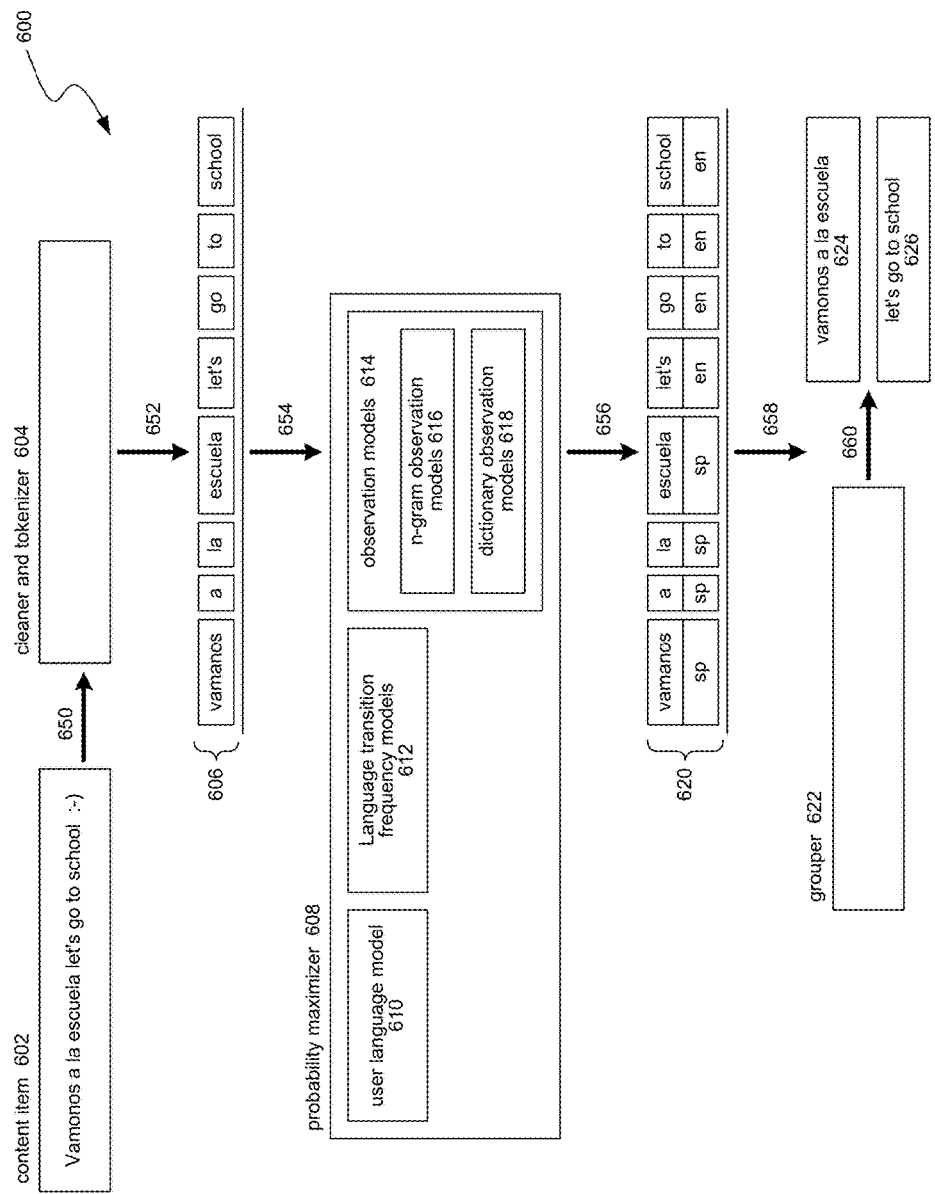
FIG. 6 is an example illustrating determining language segments of a content item.

FIG. 6 is an example 600 illustrating determining language segments of a content item. As show in FIG. 6, a content item 602 is received. The content item 602 includes a content of "Vamonos a la escuela let's go to school :-)". The content item 620 is transmitted (650) to the cleaner and tokenizer 604 (also referred to as tokenization module) through an information flow 650.

The cleaner and tokenizer 604 cleans the content item 620. For example, the emoticon ":-)" is removed. The cleaner and tokenizer 604 further divides (652) the content item into eight tokens 606. The tokens are transmitted (654) to the probability maximizer 608.

The probability maximizer 608 includes various models such as user language model 610, language transition frequency models 612 and observation models 614. In some embodiments, the observation models 614 include both n-gram observation models 616 and dictionary observation models 618. The probability maximizer 608 (also referred to as inference engine) identifies (656) languages for the tokens by maximizing a probability computed for the ordered set of tokens. As identified languages and associated tokens are transmitted (658) to a grouper 622 (also referred to as segmentation module). Based on the identified languages, the grouper 622 groups (660) consecutive tokens into language segments 624 and 626. The language segment 624 includes a content of "vamonos a la escuela" in Spanish. The language segment 626 includes a content of "let's go to school" in English.

In particular embodiments, training elements and other data, e.g. data from an online social network, may be associated with privacy settings. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, a social-networking system may send a request to the data store for the object. The request may identify the user associated with the request and may only be sent to the user if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. Although this disclosure describes enforcing privacy settings in a particular manner, this disclosure contemplates enforcing privacy settings in any suitable manner.

Some embodiments described herein make use of data or metrics that may include information voluntarily provided by one or more users. In such embodiments, data privacy may be protected in a number of ways.

For example, the user may be required to, or may voluntarily, opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for improving language processing technologies by determining language segments of a content item, comprising:

receiving a content item derived from a social network item, the content item comprising two or more words, wherein at least a first portion of the two or more words were composed in a first language and at least a second portion of the two or more words were composed in a second language different from the first language;

tokenizing the content item into an ordered set of tokens comprising one or more tokens;

identifying:
the first language for a first set of the one or more tokens by a machine learning model, and
the second language for a second set of the one or more tokens by the machine learning model,
wherein the identifying is performed by maximizing a probability computed for the ordered set of tokens based on a combination of transition probabilities, a respective transition probability corresponding to each token after the first token in the ordered set of tokens, wherein each respective transition probability indicates a likelihood of switching from a language of a previous token to a language of a current token in the ordered set of tokens; and grouping consecutive ones of the one or more tokens into the language segments based on the identifying, wherein a first of the language segment corresponds to the first language and a second language segment corresponds to the second language.

2. The method of claim 1, wherein the combination of transition probabilities is a product of the transition probabilities.

3. The method of claim 1, wherein the probability computed for the ordered set of tokens is based on a combination of observation probabilities, one observation probability corresponding to each token in the ordered set of tokens, wherein each observation probability indicates a probability for a corresponding token of the ordered set of tokens that the corresponding token is in the language.

4. The method of claim 3, wherein an observation probability for a corresponding token is determined such that:
where the corresponding token corresponds to a known word, the observation probability for the corresponding token is computer using an in-vocabulary distribution based on observed occurrences of that word appearing in various languages; and
where the corresponding token does not correspond to a known word, the observation probability for the corresponding token is computed by dividing the token into one or more n-grams and computing a combination of probabilities for the one or more n-grams using an out-of-vocabulary distribution based on observed occurrences of the one of more n-grams appearing in various languages.

5. The method of claim 3, wherein the combination of observation probabilities is a product of the observation probabilities.

6. The method of claim 1, wherein maximizing the probability computed for the ordered set of tokens is further based on a user language probability, wherein the user language probability indicates a probability that an author of the content item is facile with the language corresponding to the first token of the one or more tokens.

7. The method of claim 1, wherein the method further comprises, prior to tokenizing the content item into an ordered set of tokens, using a pattern matching to:
remove established patterns from the content item; or
replace established patterns in the content item with whitespace.

8. The method of claim 7, wherein the established patterns include dates, times, email addresses, URLs, hashtags, emoji, emoticons, mentions, symbols, or non-words.

9. The method of claim 7, wherein the established patterns are replaced with an equivalent amount of whitespace such that the text boundaries of the content item are preserved.

10. The method of claim 1, wherein tokenizing the content item into an ordered set of tokens comprises identifying each of the one or more tokens as a word from the content item.

11. The method of claim 10, wherein tokenizing the content item into an ordered set of tokens comprises:
splitting the content item into the tokens by using whitespaces as boundaries; and
running the tokens through a computer character library for locales that are not whitespace delimited.

12. The method of claim 1, further comprising, prior to identifying languages for the one or more tokens:
converting the tokens to all lower case letters;
removing tokens from the ordered set of tokens that contain only numbers; and
removing tokens comprising patters of letters that repeat above a threshold amount.

13. The method of claim 1, wherein the probability computed for the ordered set of tokens is further based
a combination of observation probabilities with one observation probability corresponding to each token in the ordered set of tokens, wherein each observation indicates a probability for a corresponding token of the ordered set of tokens that the corresponding token is in the language.

14. The method of claim 1, further comprising:
identifying a social media object where a first user who produced content of the social media object and a second user who received the social media object share a common language preference of a language;
including the social media object as part of a training dataset labeled as in the language; and
training a machine learning model for identifying the languages using the training dataset.

15. A system for improving language processing technologies by determining language segments of a content item, comprising:
an interface configured to receive a content item comprising two or more words, wherein at least a first portion of the two or more words were composed in a first language and at least a second portion of the tow or more words were composed in a second language different from the first language;
a tokenization module configured to tokenize the content item into an ordered set of tokens comprising one of more tokens;
an inference engine configured to identify the first language for a first set of the one or more tokens and the second language for a second set of the one or more tokens, wherein the identifying is performed by maximizing a probability computed for the ordered set of tokens based on:
a combination of transition probabilities, a respective transition probability corresponding to each token after the first token in the ordered set of tokens, wherein each respective transition probability indicates a likelihood of switching from a language of a previous token to a language of a current token in the ordered set of tokens; and
a segmentation module configured to group consecutive ones of the one or more tokens into the language segments based on the identifying, wherein a first of the language segment corresponds to the first language and a second of the language segment corresponds to the second language;
wherein the language segments with corresponding language identifications are used in one or more language processing technologies including one or more of: machine translation, part-of-speech tagging, topic labeling, spell checking, or any combination thereof, thereby providing the improvement to the one or more language processing technologies.

16. The system of claim 15, wherein the inference engine is flexible to detect transition points at a token level and a sentence level, wherein the transition points are places where content changes from one language to another language.

17. A system of claim 15, wherein the inference engine is further configured to generate confidence levels associated with the identified languages for the one or more tokens.

18. A non-transitory computer-readable storage medium storing instructions that, when executed by a computing system, cause the computing system to perform operations for determining language segments of a content item, the operations comprising:
receiving a content item comprising two or more words, wherein at least a first portion of the two or more words were composed in a first language and at least a second portion of the two or more words were composed in a second language different from the first language;
tokenizing the content item into an ordered set of tokens comprising one or more tokens;
identifying the first language for a first set of the one or more tokens and the second language for a second set of the one or more tokens, wherein the identifying is performed by maximizing a probability computer for the ordered set of tokens based on both:
a combination of transition probabilities, a respective transition probability corresponding to each token after the first token in the ordered set of tokens, wherein each respective transition probability indicates a likelihood of switching from a language of a previous token to a language of a current token in the ordered set of tokens, and a combination of observation probabilities, one observation probability corresponding to each token in the ordered set of tokens, wherein each observation probability indicates a probability, for a selected token of the ordered set of tokens, that the selected token is in the language corresponding to the selected token; and grouping consecutive ones of the one or more tokens into the language segments based on the identifying, wherein a first of the language segment corresponds to the first language and a second of the language segment corresponds to the second language; wherein the language segments with the corresponding language identifications are used in one or more language processing technologies including one or more of: machine translation, part-of-speech tagging, topic labeling, spell checking, or any combination thereof, thereby providing an improvement to the one or more language processing technologies.

19. The non-transitory computer-readable storage medium of claim 18, wherein the combination of transition probabilities is a product of the transition probabilities, and wherein the combination of observation probabilities is a product of the observation probabilities.

* * * * *